Nov. 1, 1927.

J. E. BATIE 1,647,599

CONVEYER APPARATUS

Filed Feb. 15, 1926

INVENTOR.
Joseph E. Batie
BY
ATTORNEY.

Nov. 1, 1927.

J. E. BATIE 1,647,599

CONVEYER APPARATUS

Filed Feb. 15, 1926    3 Sheets-Sheet 3

INVENTOR.
Joseph E. Batie
BY
ATTORNEY.

Patented Nov. 1, 1927.

1,647,599

UNITED STATES PATENT OFFICE.

JOSEPH E. BATIE, OF DETROIT, MICHIGAN, ASSIGNOR TO KELSEY WHEEL COMPANY, INC., OF DETROIT, MICHIGAN, A CORPORATION OF NEW YORK.

CONVEYER APPARATUS.

Application filed February 15, 1926. Serial No. 88,345.

The invention relates to conveyer apparatus and is particularly applicable to conveyer apparatus used in conjunction with drying ovens. One of the objects of the invention is to provide a conveyer apparatus including a device for carrying a plurality of work members and mechanism for advancing and operating the device at a predetermined time during the advancement to release the work members. Another object is to provide an effective device for carrying a plurality of work members in spaced relation, this device being so constructed that it may be cheaply manufactured and easily operated. With these as well as other objects in view the invention resides in the novel features of construction and combinations and arrangements of parts as more fully hereinafter set forth.

In the drawings:—

Figure 4 is a sectional side elevation showing the manner of advancing the conveyer;

Figure 6 is a cross section on the line 6—6 of Figure 5;

Figure 7 is a side elevation of a portion of the releasing bar of the work carrying device.

Figure 1:
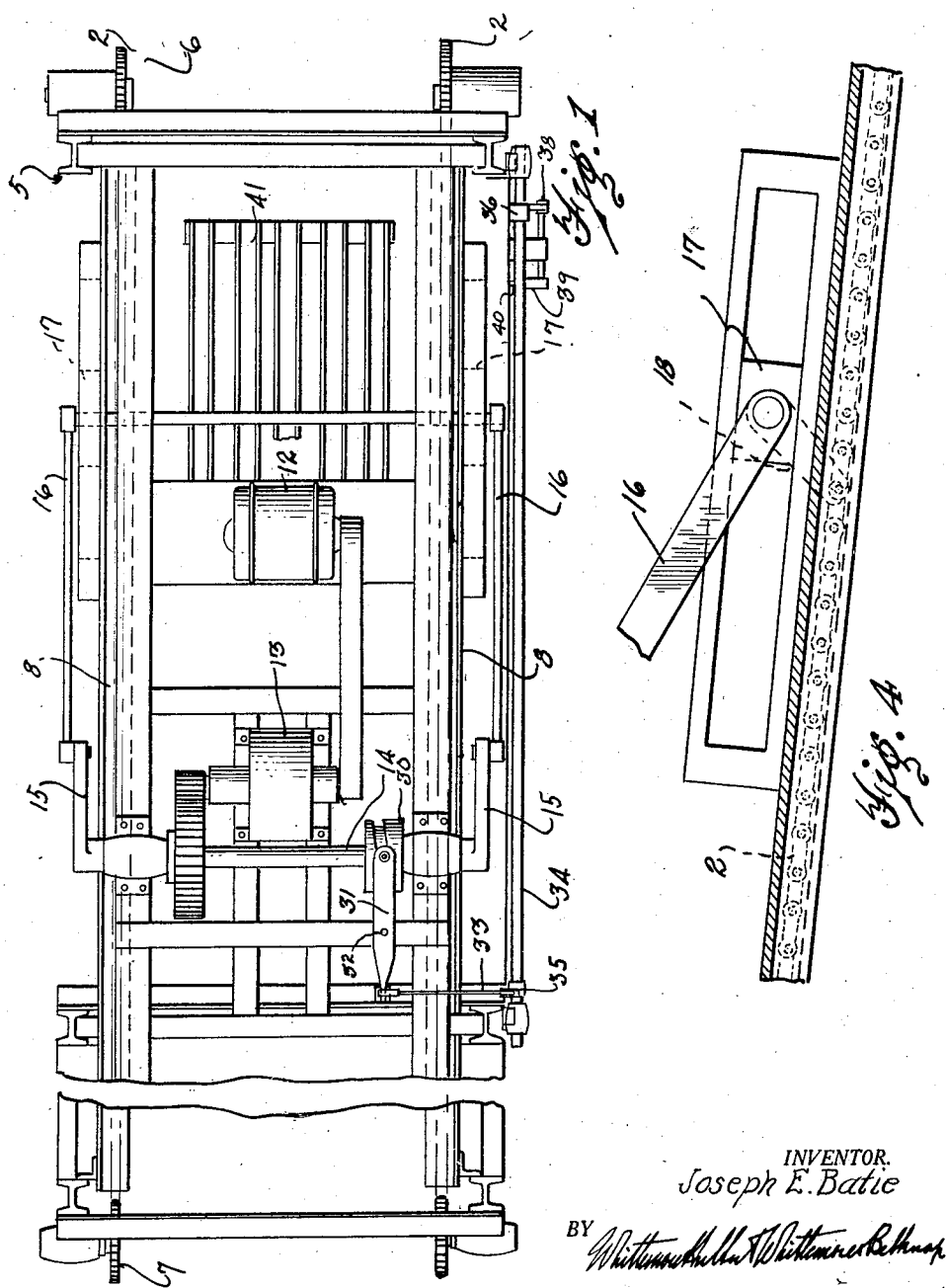
Figure 1 is a plan view of a portion of the conveyer apparatus embodying my invention.
Figure 2:
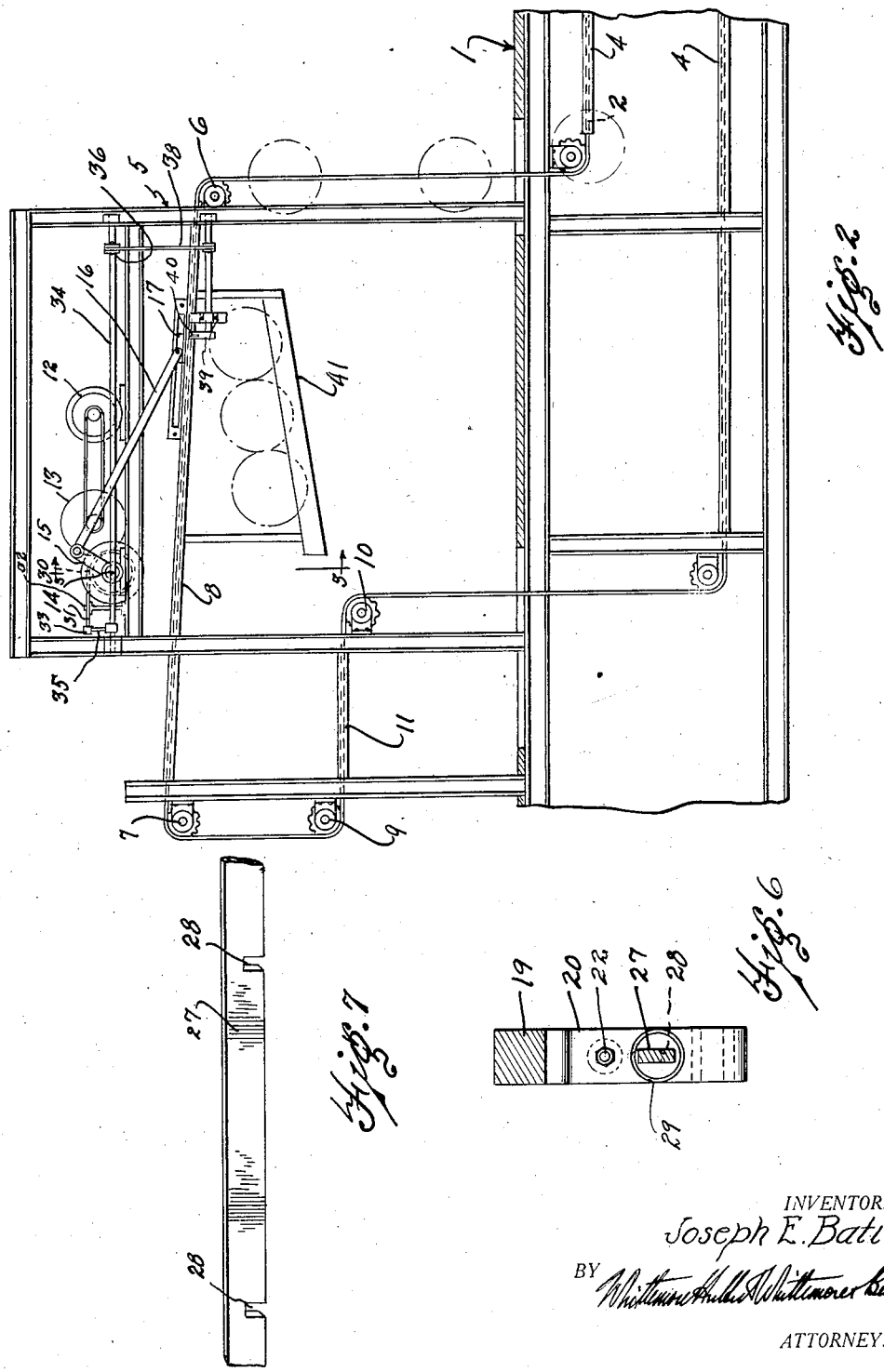
Figure 2 is a side elevation thereof.
Figure 3:
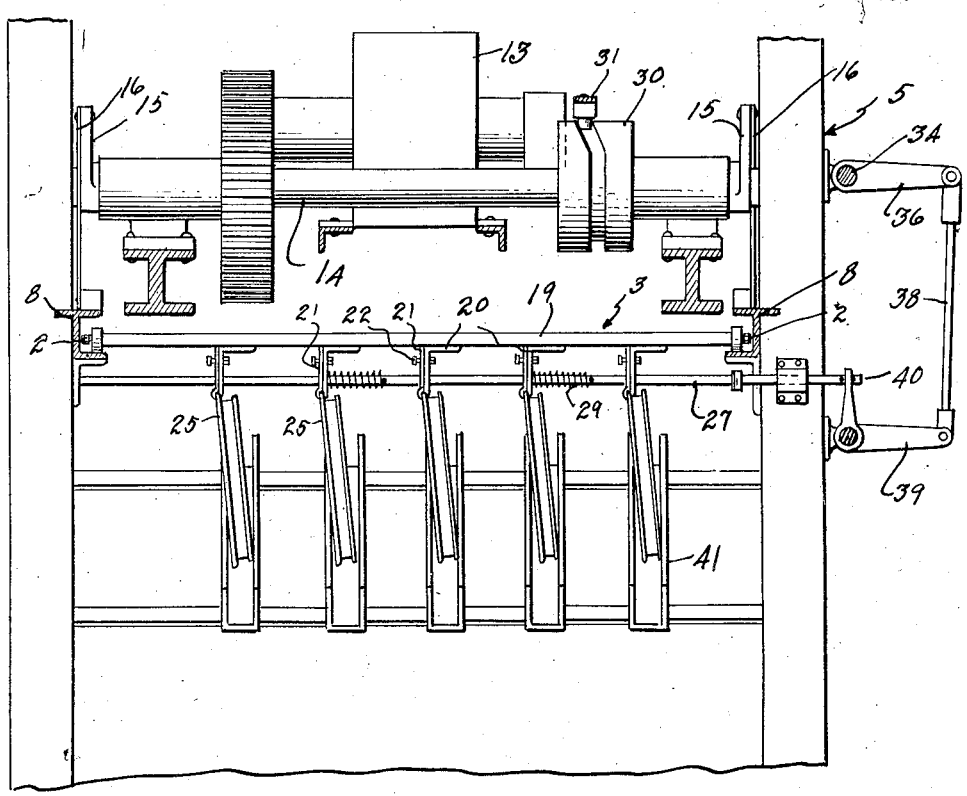
Figure 3 is an end elevation thereof, partly in section.

In the present instance my invention is designed for use in conveying vehicle spoked wheels which have just had applied thereto a coat of paint, oil or the like, through a drying oven. This oven is indicated by the reference character 1. The conveyer comprises the laterally spaced endless sprocket chains 2 and the work carrying devices 3 extending transversely of and connected to the chains. 4 are tracks extending longitudinally within the oven for guiding the chains and work carrying devices. 5 is the frame structure of the conveyer apparatus located at the open end of the drying oven and having mounted at its rear end the sprockets 6 which are located a substantial distance above the floor for engagement with the upwardly extending return portions of the chains. This frame structure has at its front end the sprockets 7 over which the chains run, the portion of the frame structure between the sprockets 6 and 7 being preferably provided with the tracks 8 for guiding the chains and work carrying devices. 9 are sprockets below the sprockets 7 and 10 are sprockets longitudinally inward relative to the sprockets 9, these two sets of sprockets being engageable by the chains. The frame structure is preferably provided with the tracks 11 extending between the sprockets 9 and 10 and adapted to guide the chains and work carrying devices. The sprockets 9 and 10 are located a sufficient distance above the floor to permit a workman to walk beneath the portion of the conveyer extending between these sprockets to load the conveyer.

The conveyer chains are advanced simultaneously with a step by step movement by suitable means which in the present instance is located above the conveyer. This means as shown includes the electric motor 12, the speed reducer 13 driven from the electric motor and rotating the crank shaft 14, at opposite ends of which are secured the cranks 15. These cranks are located on opposite sides of the frame structure and have their free ends secured to the connecting rods 16, which in turn are secured to the slides 17. These slides are guided upon the frame structure and are pivotally connected to the dogs 18 which are adapted to engage the pintles of the conveyer chains and during their movement in one direction simultaneously advance these chains, while during their movement in the other direction slide over the pintles and allow the conveyer chains to remain stationary.

Figure 5:
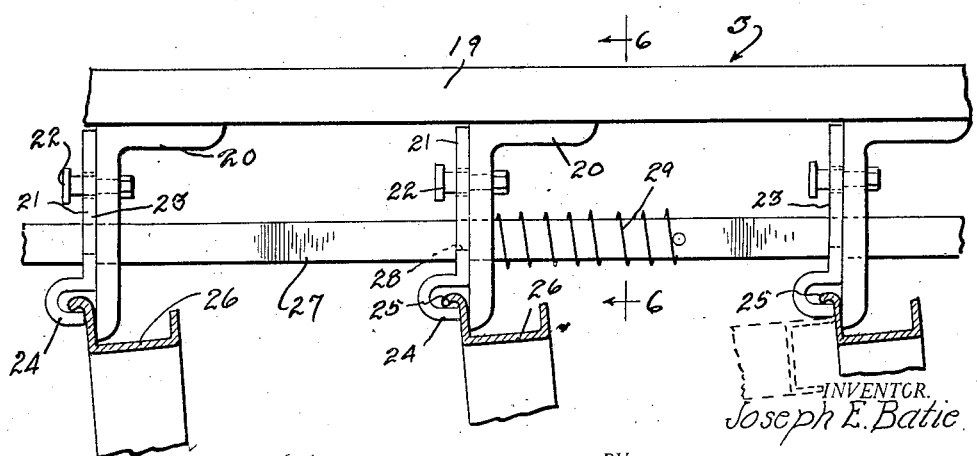
Figure 5 is a side elevation of a portion of the work carrying device.

The work carrying devices 3 carry the vehicle spoked wheels and each device includes the supporting bar 19 which is adapted to be supported at its opposite ends upon the various tracks for guiding the conveyer chains. 20 are brackets secured to and depending from each carrier bar at longitudinally spaced intervals. 21 are hooked members, there being one hooked member for each bracket. Each hooked member is carried by the shouldered pin 22 which freely extends through the hooked member and is rigidly secured to the bracket. Each hooked member has a body portion 23 which is adapted to lie adjacent to a vertical face of the bracket and a U-shaped portion 24 at its lower end which laterally opens toward the adjacent face of the bracket and terminates a sufficient distance therefrom to permit the entrance of the flared flange 25 of the wheel felly 26 when the wheel is at an angle, as indicated by the dotted lines in Figure 5, to its final suspended position. The U-shaped portion 24 of each hooked member is adapted to embrace this flared felly flange and the adjacent face of the bracket is adapted to prevent a lateral disengaging movement of the felly from the hooked member so that the wheel is normally retained by means of these cooperating members and may be carried by the conveyer. 27 is a releasing bar for the carrying device, this bar extending through the brackets 20 substantially parallel to the supporting bar 19 and also through the hooked members 21. The lower edge of this releasing bar is however provided with the notches 28 for engaging over upstanding portions of the hooked members located above the bottoms of the openings in the brackets whereby movement of the releasing bar effects movement of the hooked members toward or away from their respective brackets. 29 are coil springs surrounding the releasing bar for normally forcing the same in a direction to hold the hooked members against their respective brackets.

To effect the release of the vehicle spoked wheels after they have gone through the drying oven I have provided the cam 30 which is secured to the crank shaft 14 and is adapted to swing the lever 31 pivoted upon the frame structure at 32. This lever in turn is connected through a universal joint to the pull rod 33 which extends transversely of the frame structure. 34 is a rock shaft mounted at one side of the frame structure and having secured thereto the rock arms 35 and 36, the former of which is connected to the pull rod 33 and the latter of which is connected to the second pull rod 38. This second pull rod in turn is connected to the bell crank 39 having an upwardly extending arm adapted to engage the outer end of the bar 40, the inner end of this bar being adapted to engage the releasing bar 27. The arrangement and spacing of the work carrying devices 3 upon the conveyer chains 2 and of the cranks 15 is such that the releasing bars of the devices are located in alignment with the push rod 40 when the conveyer is stationary. Furthermore, the relative arrangement of the cam 30 and cranks 15 is such that the push rod 40 is actuated when the conveyer is stationary so that release of the vehicle spoked wheels may be effected to allow the same to drop into their respective troughs 41 which are carried by the frame structure and are located below the upper return portion of the conveyer.

What I claim as my invention is:

1. In a conveyer, the combination with a device for carrying work members in spaced relation to each other and means for advancing said device, of means including a revoluble cam positively actuated by said advancing means for effecting the release of the work members simultaneously from said device.

2. In a conveyer, a carrier comprising a support, a transverse member carried by said support, a member carried by said support and having a U-shaped portion opening laterally toward said first mentioned member and adapted to embrace a portion of the work member, said second member being movable toward and away from said first mentioned member and cooperating therewith to normally retain the work member, means for yieldably forcing said second member toward said first mentioned member and means including a bar extending through said first mentioned member and engaging said second member for moving the latter away from the former.

3. In a conveyer, a carrier comprising a supporting bar, depending brackets carried by said bar, hooked members carried by said bar and having at their lower ends laterally opening U-shaped portions, said hooked members cooperating with said brackets to normally retain work members, a bar carried by said supporting bar and extending substantially parallel thereto and operatively connected to said hooked members for moving the same away from their respective brackets, and means connected to said last mentioned bar for yieldably retaining the same in position to hold said hooked members adjacent to said brackets.

4. In a conveyer, a carrier comprising a supporting bar, depending brackets secured to and spaced longitudinally on said bar, hooked members having at their lower ends laterally opening U-shaped portions, said hooked members being carried by said brackets and their U-shaped portions opening toward their respective brackets, a bar slidably engaging said brackets and having longitudinally spaced notches for connection with said hooked members and a spring surrounding said bar for yieldably forcing the same to retain said hooked members adjacent to their respective brackets.

5. In a conveyer, a carrier for a work member comprising a support, a depending member carried by said support, a hooked member carried by said support and having a body portion adapted to extend adjacent to said first mentioned member and a U- shaped end portion opening laterally toward said first mentioned member and terminating at a distance from said first mentioned member to permit entrance of an edge of the work member when at an angle to its normally suspended position, and means including a cam actuated bar having a portion engaging said hooked member for moving the latter away from the depending member.

6. In a conveyer, a carrier comprising a supporting bar, brackets secured to and depending from said bar at longitudinally spaced intervals, hooked members carried by said brackets having U-shaped portions opening toward their respective brackets, said hooked members cooperating with the brackets to normally retain work members, and means including a bar extending freely through said brackets and hooked members for moving the latter away from said brackets.

7. In a conveyer, the combination with a device for carrying work members in spaced relation to each other and means for intermittently advancing said device, of means including a revoluble cam actuated by said advancing means for effecting the release of the work members at a period when the conveyer is stationary.

8. In a conveyer, a carrier for work members comprising a support, transverse members carried by said support, hooked members carried by the members aforesaid and having portions cooperating therewith to normally retain the work members, a bar carried by the support and connected to said hooked members, and means including a single cam effective when the conveyer is stationary to advance said bar and move said hooked members away from the first mentioned members for releasing the work members simultaneously.

9. In a conveyer, a carrier for a plurality of articles comprising a support, transverse members upon said support, members carried by said support and cooperating with the members aforesaid to normally retain the articles upon said carrier, and means including a revoluble cam for moving said second mentioned members bodily away from said first mentioned members to effect the release of said articles.

In testimony whereof I affix my signature.

JOSEPH E. BATIE.